United States Patent
Parker et al.

[11] Patent Number: 6,011,650
[45] Date of Patent: Jan. 4, 2000

[54] DECORATIVE OPTICAL DISPLAY APPARATUS

[75] Inventors: William P. Parker, Waitsfield, Vt.; Peter H. Stephens, San Francisco, Calif.

[73] Assignee: Rainbow Design LLC, Waitsfield, Vt.

[21] Appl. No.: 09/031,177

[22] Filed: Feb. 26, 1998

Related U.S. Application Data

[60] Provisional application No. 60/042,189, Mar. 31, 1997.

[51] Int. Cl.[7] ............................. G02B 5/18; G02B 5/32; B42D 15/00
[52] U.S. Cl. ..................... 359/567; 359/566; 359/15; 359/570; 359/1; 283/86; 362/806
[58] Field of Search ................................. 359/1, 2, 3, 24, 359/32, 15, 567, 570; 283/85, 86; 362/806–811

[56] References Cited

U.S. PATENT DOCUMENTS

| | | |
|---|---|---|
| 734,133 | 7/1903 | Porter . |
| 3,610,918 | 10/1971 | Barlow ........................ 240/10 |
| 3,790,772 | 2/1974 | Newman et al. ............... 240/10 R |
| 3,914,761 | 10/1975 | Murase et al. ................ 340/366 B |
| 3,949,350 | 4/1976 | Smith ............................ 240/10 R |
| 4,259,709 | 3/1981 | Eddings ....................... 362/231 |
| 4,716,506 | 12/1987 | Shang .......................... 362/293 |
| 4,795,223 | 1/1989 | Moss ............................ 359/567 |
| 4,799,764 | 1/1989 | Crowell ........................ 359/567 |
| 4,834,475 | 5/1989 | Robinson ..................... 359/32 |
| 4,892,369 | 1/1990 | Moss ............................ 350/3.7 |
| 4,916,593 | 4/1990 | Moss et al. ................... 362/80.1 |
| 4,972,305 | 11/1990 | Blackburn .................... 362/234 |
| 5,032,003 | 7/1991 | Antes ........................... 350/162.18 |
| 5,058,992 | 10/1991 | Takahashi ..................... 359/567 |
| 5,101,193 | 3/1992 | Smith et al. .................. 340/479 |
| 5,184,848 | 2/1993 | Itoh et al. ..................... 283/86 |
| 5,186,533 | 2/1993 | Hori ............................. 362/80.1 |
| 5,247,491 | 9/1993 | Kwiatkowski ................ 368/79 |
| 5,276,599 | 1/1994 | Neeley ......................... 362/301 |
| 5,303,129 | 4/1994 | Hori ............................. 362/80.1 |
| 5,617,248 | 4/1997 | Takahashi et al. ............ 359/567 |
| 5,708,519 | 1/1998 | Yamamoto et al. ........... 359/15 |

*Primary Examiner*—Cassandra Spyrou
*Assistant Examiner*—Audrey Chang
*Attorney, Agent, or Firm*—Downs Rachlin & Martin PLLC

[57] ABSTRACT

A decorative optical display (20) utilizing a reflective diffraction grating (94) or a transmissive diffraction grating (304) and a plurality of polychromatic light sources (60) disposed around perimeter (106) of the reflective diffraction grating or perimeter (314) of the transmissive diffraction grating. The light sources are disposed so as to the illuminate the reflective or transmissive diffraction grating at an oblique angle (204) or (328), respectively. The oblique illumination of the reflective or transmissive diffraction grating prevents a viewer (200) from seeing undiffracted light rays (212) or (336) emanating from the light sources, which can detract from the appeal of the optical display pattern (250). The reflective or transmissive diffraction grating may be flat or curved and may be supported by a support member (90). Further, the reflective or transmissive diffraction grating may have either a single or multiple axes. A shade (114) is provided to cover the light sources to prevent undiffracted light rays from reaching the viewer, or to hide wires (76) connecting the light sources. Also, the activation of the light sources is controlled via a control unit (152), and can be set to any one of a number of different temporal and spatial activation modes. The optical display is also adaptable for a variety of uses calling for an attractive display, such as a clock (500) or a display sign (600).

37 Claims, 8 Drawing Sheets

DECORATIVE OPTICAL DISPLAY APPARATUS

This application claims the benefit of U.S. Provisional Application Ser. No. 60/042,189, filed Mar. 31, 1997.

FIELD OF THE INVENTION

The present invention relates to decorative optical displays, and in particular to such displays utilizing diffraction gratings to form a variety of decorative light patterns.

BACKGROUND OF THE INVENTION

Decorative optical displays have been popular as novelty items for over a century. Most of the known decorative optical displays (also referred to as "light sculptures," or "decorative lighting assemblies,") use various combinations of mirrors, light bulbs, lasers, prisms, lenses, colored glass, and diffraction gratings to achieve a variety of aesthetically pleasing visual effects.

A typical example of a decorative optical display apparatus is U.S. Pat. No. 5,276,599 to Neely, which discloses a light sculpture which displays light patterns inside a box-like enclosure. The enclosure includes planar mirrored panels joined together at right angles to form reflective walls, with one wall being translucent to permit an observer to look inside. Attached to the bottom of the enclosure is a hollow base which includes a plurality of light sources. The light patterns produced consist of light emanating directly from the light sources, as well as light reflected from the walls of the enclosure.

An example of an optical display apparatus that employs a diffraction grating is U.S. Pat. No. 734,133 to Porter (hereinafter, "the '133 patent"). The '133 patent discloses a light source, such as an arc lamp, placed behind a flat transmissive diffraction grating. The light source is then viewed through the diffraction grating by an observer. The diffraction grating disperses the light in a direction perpendicular to the orientation of the grating lines, so that an observer sees a "spoke" of light varying in color over its length. For a diffraction grating having multiple sets of grating lines (so called "multi-axis" diffraction gratings), multiple spokes of light are produced equal to the number of superimposed grating lines. Also, two separate diffraction gratings in proximity to one another can be used and motion can be imparted to the light patterns by rotating the diffraction gratings.

While the optical display of the '133 patent is capable of creating aesthetically pleasing light patterns, it also has several major drawbacks. The first is that placing one or more light sources directly behind the transmissive diffraction grating makes for a display apparatus that is non-compact. The second is that achieving motion in the light pattern by rotating the diffraction gratings makes the display apparatus complicated and expensive. The third is that it is not always desirable to view undiffracted light through the transmissive diffraction grating because the undiffracted light tends to overwhelm the diffracted light.

SUMMARY OF THE INVENTION

The present invention relates to decorative optical displays, and in particular to such displays utilizing diffraction gratings to form a variety of decorative light patterns. The decorative optical display includes a diffraction grating and a plurality of polychromatic light sources. The light sources are disposed about the perimeter of the grating such that they illuminate the grating at an oblique angle. The diffraction grating can be transmissive or reflective, and can have either a single diffraction axis, or multiple diffraction axes. Further, the diffraction grating need not be flat, but can be curved to enhance the optical display pattern. To maintain the shape of and otherwise support the diffraction grating, a support surface may be provided upon which the diffraction grating conformally resides. In the case of a reflective diffraction grating, the support surface can be opaque because the diffraction grating is illuminated from above. In the case of a transmissive diffraction grating, the support surface is reflective when illuminated from above, and non-opaque when illuminated from below. To create the effect of a dynamic display, a control unit is connected to the light sources for controlling various temporal and spatial activation modes of the light sources. A manual selecting means, such as a knob, is connected to the control unit and is used to select a particular temporal activation mode.

The optical display apparatus of the present invention is adaptable for a variety of uses calling for an attractive display. Thus, one such aspect of the present invention is an optical display clock. Another such aspect of the present invention is an optical display sign having a non-opaque faceplate over the front of the display and having letters or symbols inscribed or residing thereon.

DETAILED DESCRIPTION OF THE INVENTION

Figure 1:
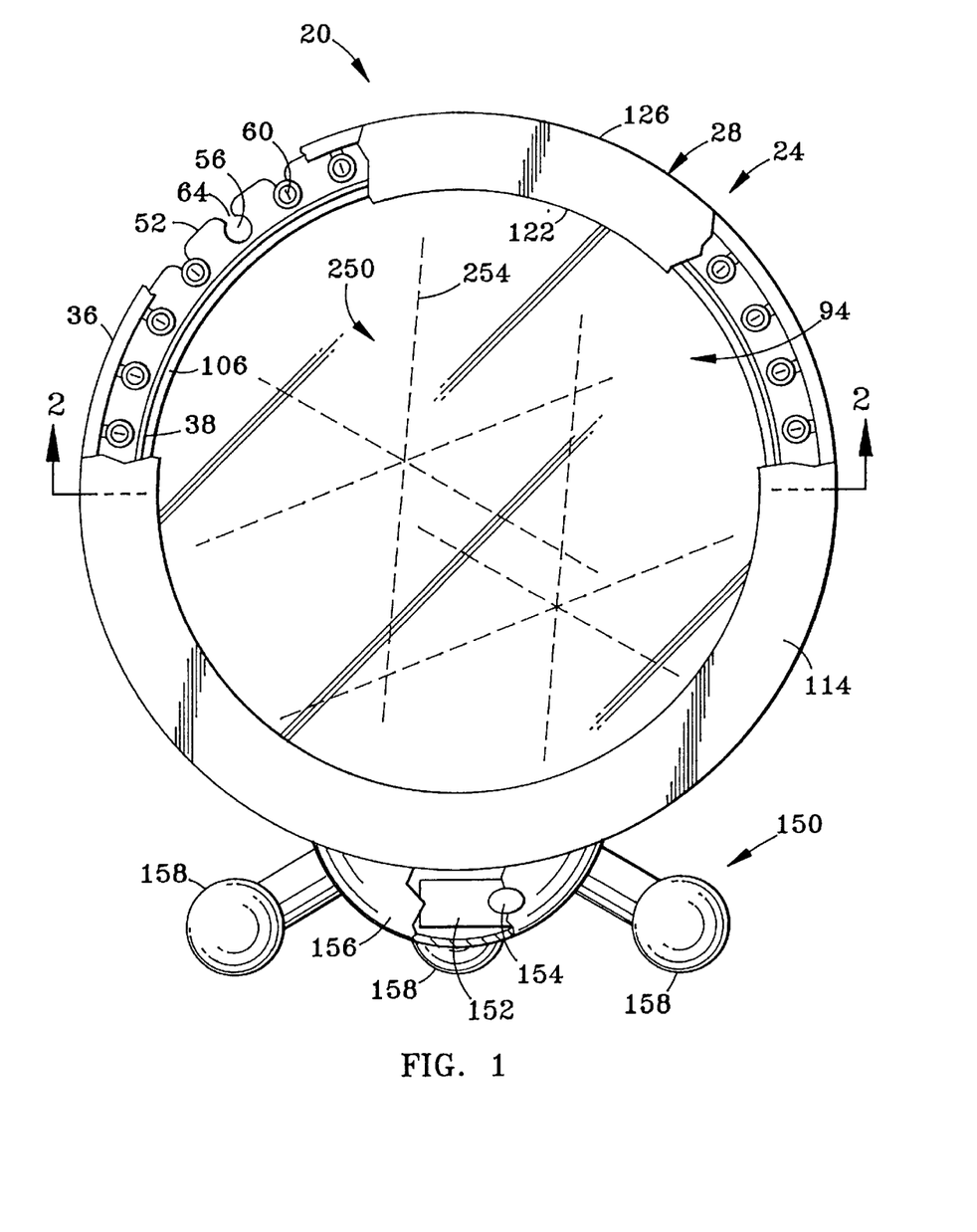
FIG. 1 is a front perspective view of the optical display apparatus of the present invention.
Figure 2:
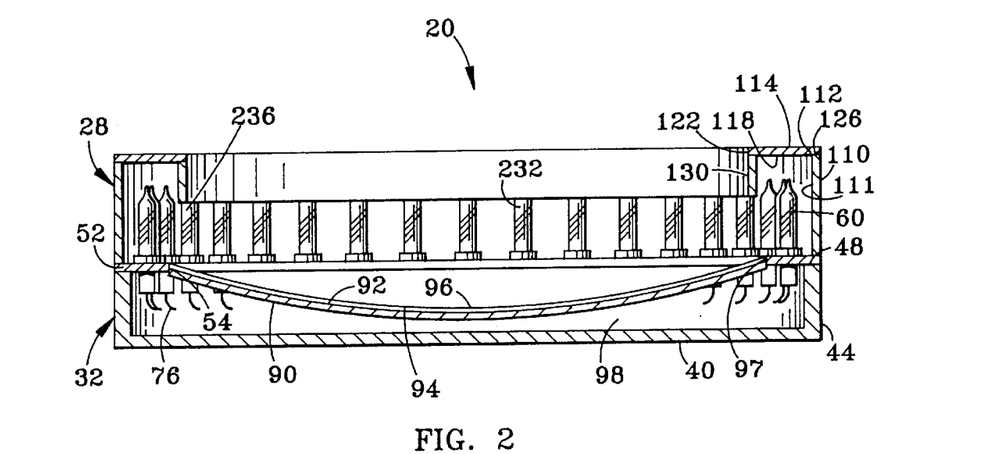
FIG. 2 is a cross-sectional view of an embodiment of the optical display apparatus of the present invention utilizing a reflective diffraction grating, taken at line 2—2 in FIG. 1.

The present invention is an optical display apparatus for creating decorative light patterns using diffraction effects from either a reflective or a transmissive diffraction grating. Referring to FIGS. 1 and 2, optical display apparatus 20 includes a main body 24 comprising a front housing 28 and a confronting rear housing 32 (see FIG. 2). Front housing 28 is shown in FIG. 1 as having a display perimeter 36 and a large display aperture 38 that is circular, but display perimeter 36 and display aperture 38 can have an arbitrary shape.

Optical display apparatus 20 is properly viewed "face on," through display aperture 38, as shown in the front view of FIG. 1.

With reference to FIG. 2, rear housing 32 includes a back 40 and a wall 44 with an upper rim 48. Rear housing 32 further includes a light source mounting frame 52 fixed atop upper rim 48 of wall 44 and extending inwardly from wall 44. Mounting frame 52 defines central aperture 38. As can be seen in FIG. 1, light source mounting frame 52 includes a plurality of light source mounting apertures 56 for mounting light sources 60. Preferably, mounting apertures 56 include a slot 64 to facilitate the insertion and removal of light sources 60.

Figure 3A:
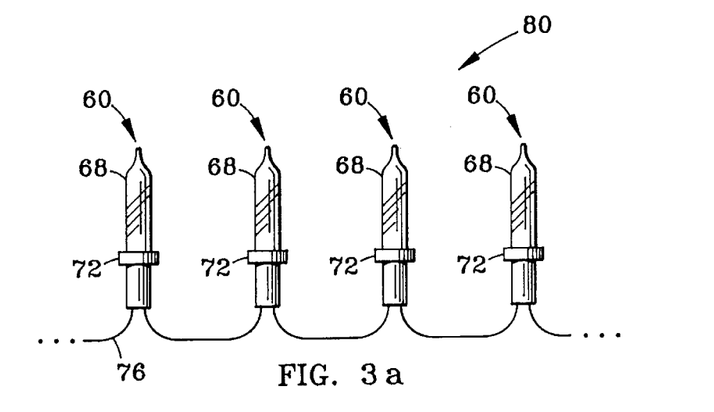
FIG. 3a is a side view of a single-wire light string used in a preferred embodiment of the present invention.

With reference now to FIGS. 1 and 3a, in a preferred embodiment of the present invention, light sources 60 are polychromatic incandescent light bulbs having a glass enclosure 68 and a socket 72, and are electrically interconnected by a wire 76 to form a single-wire light string 80. Light string 80 is suitable when each light source 60 blinks independently and does not break the current flowing in wire 76. Thus, light string 80 is preferred when simplicity is desired, since there is no need for a control unit to control the activation of light sources 60, as described below. FIGS. 2, 4, 5, 6 and 8 are shown to include a single-wire light string for the sake of simplicity.

Figure 3B:
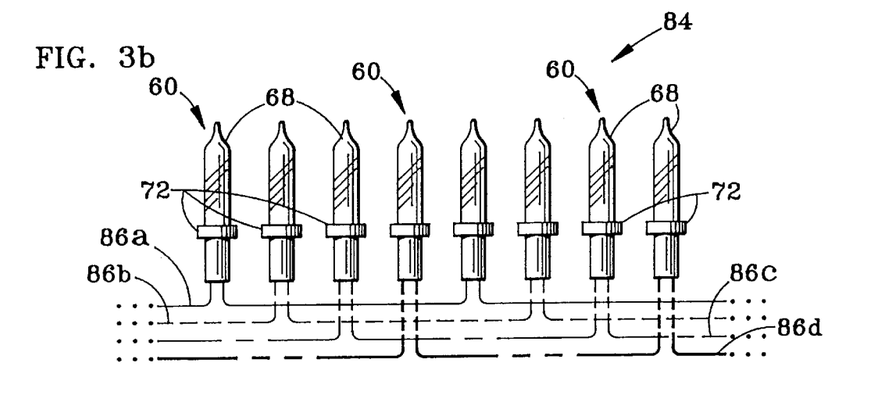
FIG. 3b is a side view of a multiple-wire light string used in a preferred embodiment of the present invention.

With reference now to FIG. 3b, in another preferred embodiment of the present invention, a multiple-wire light string such as light string 84 is employed. Light string 84 includes light sources 60 alternately interconnected by wires 86a–86d. Light string 84 is referred to as a "four-string" light string because it uses four different wires 86a–86d. Wires 86a–86d are arranged such that any set of four adjacent light sources in light string 84 are connected to a different wire. Also, every fifth bulb in light string 84 is connected to the same wire. Thus, counting the eight light sources 60 shown in FIG. 3b from left to right, wire 86a connects the first and fifth light sources, wire 86b connects the second and sixth light sources, wire 86c connects the third and seventh light sources, and wire 86d connects the fourth and eighth light sources. This pattern repeats over the length of light string 84, which may have tens or hundreds of light sources 60. An exemplary four string light bulb string for the present invention is sold by The East West Distributing Co., Deerfield, Ill., 600158, as model no. 889867.

When a multiple-wire light string such as light string 84 is employed, activation of the light sources is acheived by controlling the current flowing in each wire via a control unit, as is discussed further below. Light sources 60 in light string 80 or 84 are included in optical display apparatus 20 by sequentially inserting the light sources into respective mounting apertures 56 through slots 64, whereupon socket 72 of each of the light sources is snap-fitted into the mounting aperture.

With reference now to FIG. 2, rear housing 32 further includes a support member 90 having an upper surface 92, and which, in a preferred embodiment, supports a reflective diffraction grating 94. Support member 90 is connected to light source mounting frame 52 and spans substantially the entire length and width of rear housing 32. That is, aperture 38 in mounting frame 52 is substantially entirely filled with support member 90. Back 40, wall 44 and support member 90 form a cavity 98 within which wires 76 from light sources 60 may be hidden. Support member 90 can be flat or have an arbitrary surface curvature, such as convex or concave. In a preferred embodiment, support member 90 is cylindrically concave (i.e., saddle-shaped), as is shown in FIG. 2. Also in a preferred embodiment, back 40, wall 44, light source mounting frame 52 and support member 90, comprising rear housing 32 are formed as a single injection-molded structure.

With reference to FIGS. 1 and 2, reflective diffraction grating 94 has an upper surface 96, a perimeter 97, and in a preferred embodiment is thin and flexible so that it lies conformally on support member 90 so that upper surface 96 is opposite upper surface 92. In a preferred embodiment, reflective diffraction grating 94 and support member 90 are made of dielectric materials (e.g., plastic and mylar, respectively) so that reflection diffraction grating 94 can be held in place on support member 90 by static electricity. In another preferred embodiment, reflective diffraction grating 94 may further include a framing member 106 running around perimeter 97, which can be attached to light source mounting frame 52 (see FIG. 1) or to support member 90 to hold the reflection diffraction grating in place relative to the support surface.

Reflective diffraction grating 94 may be a single-axis or multi-axis grating. In a preferred embodiment, reflective diffraction grating 94 is a two-axis grating having two sets of fine lines formed in surface 96 and oriented at right angles, each set of lines having a spatial frequency between 750–2000 lines/mm embossed in a 4 mil thick sheet of mylar having a reflective backing (e.g., aluminum). A reflection diffraction grating having a spatial frequency in the range between 750–2000 lines/mm is preferred because it provides for a strong diffraction effect (i.e., a high diffraction angle) at visible wavelengths. This allows for oblique illumination of the diffraction grating, the benefit of which in this reflective diffraction grating embodiment of the present invention is described in more detail below. Two exemplary diffraction gratings for the present invention are sold by SpectraTech Corp., 5405 Jandy Place, Los Angeles, Calif., 90060 under the trademarks SPECTRASHEEN (single-axis, 1000 lines/mm) and HOLOSHEEN (double-axis at right-angles, 1800 lines/mm).

With continued reference to FIGS. 1 and 2, front housing 28 includes an outer wall 110 that is positioned on mounting frame 52 adjacent the periphery thereof. Outer wall 110 has an inner surface 111 and extends upwardly from mounting frame 52 and terminates at upper rim 112. An annular shade 114 having an inner edge 122 is attached to outer wall 110 at upper rim 112 and extends inwardly so as to cover light sources 60 mounted in light source mounting frame 52. In a preferred embodiment, shade 114 is opaque and prevents light from light sources 60 from being seen by a viewer viewing optical display apparatus 20. Also in a preferred embodiment, display perimeter 36, which defines the outer surface of outer wall 110, is circular and shade 114 is annular, as shown in FIG. 1.

With reference now to FIG. 2, shade 114 preferably includes an inner wall 130 attached to shade 114 at its inner edge 122 so as to extend downwardly from the shade toward mounting frame 52. Preferably, inner wall 130 terminates at a level at least equal with, if not slightly above, light sources 60. Inner wall 130 serves to further hide light sources 60 from a viewer viewing optical display apparatus 20, as is described further below.

With reference now to FIG. 1 and FIG. 3b, in the preferred embodiment where a multiple-wire light string such as light string 84 is used, optical display apparatus 20 further includes a control base 150 connected to main body 24. Control base 150 includes a control unit 152 for controlling the operation of light sources 60 through wires 86a–86d (not shown in FIG. 1) which are fed into control base 150 and connected to control unit 152. An exemplary control unit 152 for the present invention is sold by the previously mentioned East West Distributing Co., as unit E48723, catalog no. TY-11 (120V, 60Z, 0.8A). Control unit 152 controls the timing and sequence of current flowing in each of wires 86a–86d to create a variety of light source activation sequences or "temporal and spatial activation modes" comprising the operating modes for optical display apparatus 20.

Control base 150 also includes a manual setting device 154 connected to control unit 152 for manually setting the operating mode of optical display apparatus 20. Manual setting device 154 may any one of a number of well-known setting means, such as a knob, a dial or pushbutton. Manual setting device 154 may also be in the form of a hand-held remote control unit (not shown) which communicates with the optical display control unit through a remote control sensor (not shown) incorporated into control base 150. Also, in a preferred embodiment, control base 150 includes a control unit housing 156, and support legs 158 for increased stability.

The operation of optical display apparatus 20 for creating an effective optical display is now described. Referring to FIG. 1, a user activates light sources 60 by setting manual setting device 154 to the "on" position (not shown). At this point, the user may also choose from a number of settings associated with different temporal and spatial activation modes for light sources 60 to enhance the appeal of the optical display patterns. The different temporal and spatial activation modes may include, for instance, simultaneous activation of light sources 60, random activation of light sources 60 and, more generally, alternate activation of various light sources 60 at various time intervals to create a wide variety of dynamic optical display patterns.

Figure 4:
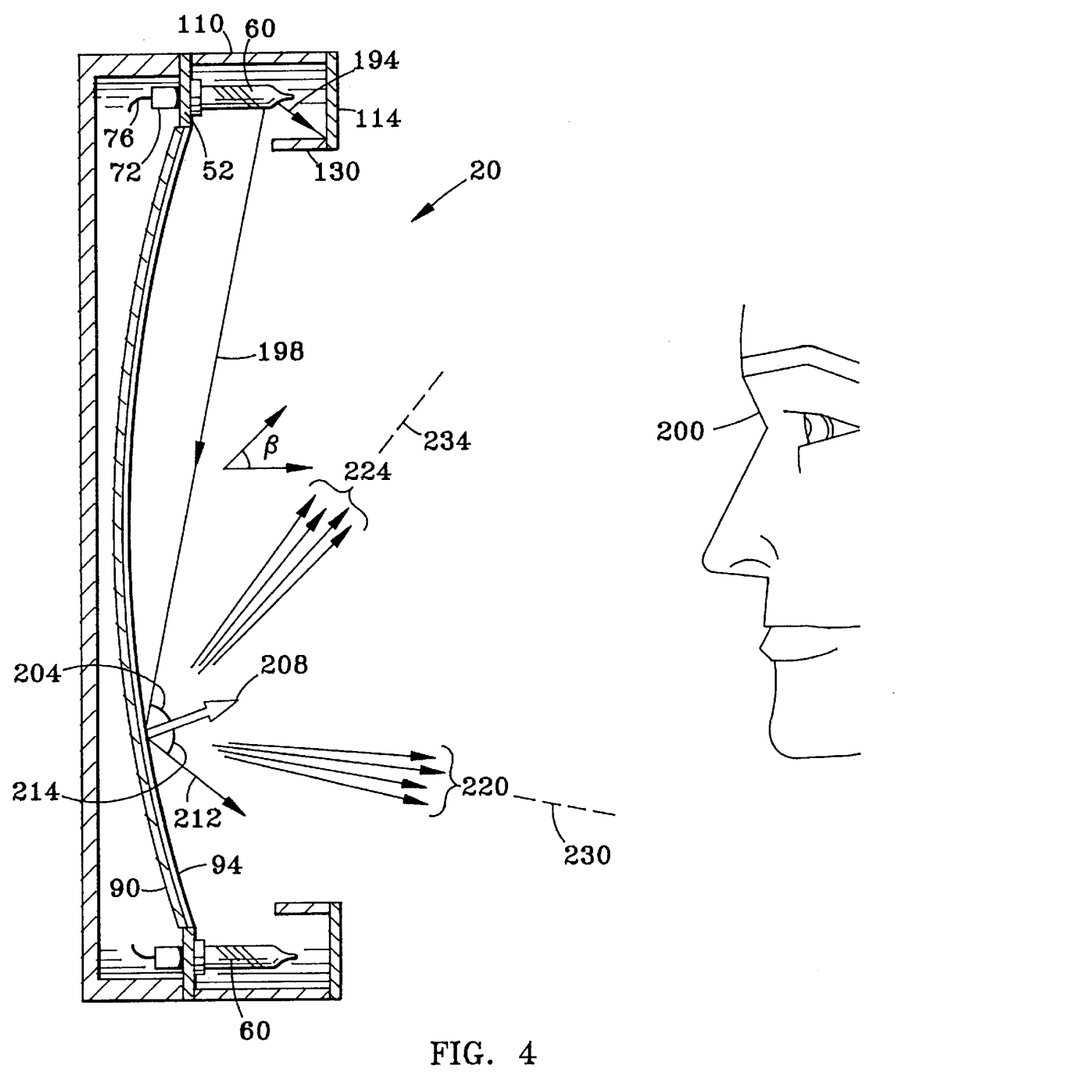
FIG. 4 is a schematic cross-sectional view similar to the view of FIG. 2, illustrating the operation of the reflective diffraction grating embodiment of the present invention.

With reference now to FIG. 4, each of light sources 60, when activated, radiates polychromatic light rays, such as light rays 194 and 198, over a wide range of directions. However, polychromatic light rays such as light ray 194 that would otherwise propagate toward a viewer 200 viewing optical display apparatus 20 are blocked by shade 114. Other polychromatic light rays, such as light ray 198, propagate toward reflective diffraction grating 94 and are incident on surface 96 at an incident angle 204 as measured with respect to reflective diffraction grating surface normal 208. In general, the incident angles of polychromatic light rays from each of light sources 60 will vary depending on the position of the light sources 60 relative to surface 96 of reflective diffraction grating 94. For instance, with reference to FIG. 2, when support member 90 and reflective diffraction grating 94 are cylindrically curved, certain of light sources 60 (e.g., light source 236) are closer to surface 96 than others (e.g., light source 232). This variation in incident angle 204 for the different light sources 60 when reflective diffraction grating is cylindrically curved enhances the three-dimensionality of the optical display pattern.

A key aspect of the present invention is illuminating the particular diffraction grating at high angles of incidence so that light sources 60 can remain hidden from view and only diffracted light is seen by a viewer. Such illumination angles, which result in a viewer not being able to see undiffracted light from light sources 60, are referred to herein as "oblique" angles. With continuing reference to FIG. 4, in which optical display apparatus 20 utilizes reflection grating 94, a portion of each incident polychromatic light ray 198 forms a reflected polychromatic light ray 212 having an reflection angle 214 equal to incident angle 204. However, because of the relatively high incident angle 204, reflection angle 214 is such that reflected polychromatic light ray 212 is outside the field-of-view angle β and thus not visible to viewer 200. The remaining portion of incident polychromatic light ray 198 is diffracted within the field-of-view angle β into light ray spectrums 220 and 224 corresponding to first diffraction order 230 and second diffraction order 234, respectively, and is visible to viewer 200. In actuality, many diffraction orders may be present, but only two are shown for the sake of illustration.

An alternate equivalent embodiment of the present invention is replacing reflective diffraction grating 94 in optical display apparatus 20 with a transmissive diffraction grating (not shown) disposed conformally on or adjacent to support member 90 with upper surface 92 being reflective (see FIGS. 2 and 4). The operation of this alternate embodiment is essentially the same as that described above for optical display apparatus 20, and shown in FIG. 4. A key difference, however, is that incident polychromatic light ray 198 passes through the transmissive diffraction grating twice, and is thus diffracted twice.

Figure 5:
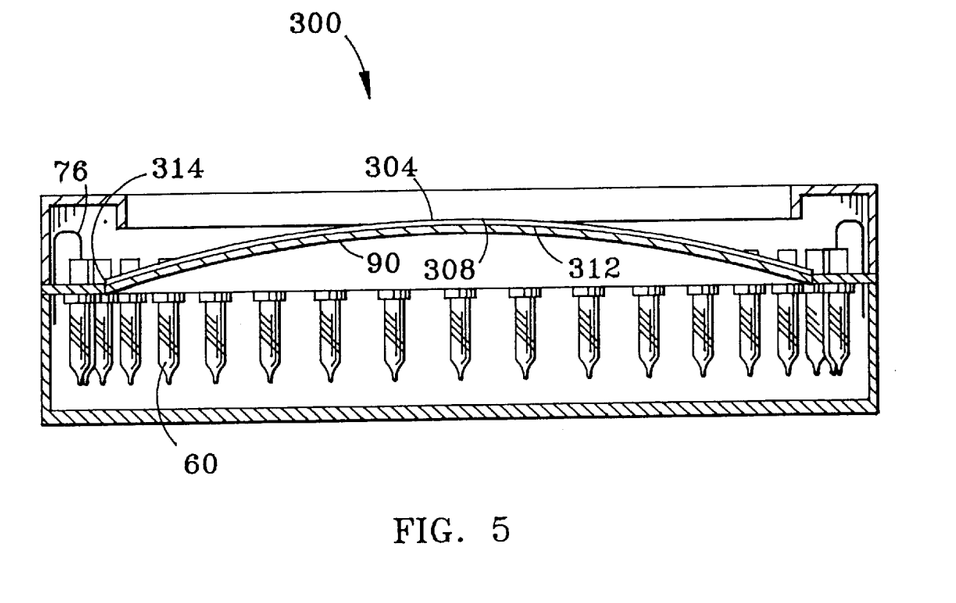
FIG. 5 is a cross-sectional view of an embodiment of the optical display apparatus of the present invention utilizing a transmissive diffraction grating, taken at line 2—2 in FIG. 1.

Another alternate embodiment of the present invention is an optical display apparatus utilizing a transmissive diffraction grating and an alternate illumination scheme. With reference to FIG. 5, optical display apparatus 300 includes all the elements of apparatus 20 (see FIGS. 1 and 2) except that reflective diffraction grating 94 in apparatus 20 is replaced with a transmissive diffraction grating 304 having a front surface 308, a back surface 312, and a perimeter 314. Display apparatus 300, in a preferred embodiment, appears the same as optical display apparatus 20 of FIG. 1. However, certain of the elements comprising optical display apparatus 20 have a different disposition or are modified slightly in optical display apparatus 300. For instance, light sources 60 are disposed "upside-down" in mounting apertures 56 of mounting frame 32 so that they point towards back 40 of rear housing 32. Also, if a support member 90 is used to support a transmissive diffracting grating, it should be non-opaque. In addition, if support member 90 is to be curved, it should curve away from back 40 so that light sources 60 can illuminate back surface 312 of transmissive diffraction grating 304 at oblique angles. Also, shade 114 need not be used to prevent a viewer from seeing light sources 60 when viewing optical display apparatus 300. However, it may be desirable to use shade 114 to cover wires 76 from being visible to a viewer viewing optical display apparatus 300.

Further, transmissive diffraction grating 304 may be a single-axis or multi-axis grating. In a preferred embodiment, transmissive diffraction grating 304 is a two-axis grating having two sets of fine lines formed in either upper surface 308 or back surface 312, and oriented at right angles. A transmission diffraction grating having a spatial frequency in the range between 750–2000 lines/mm is preferred because, as mentioned previously, it provides for a strong diffraction effect (i.e., a high diffraction angle) at visible wavelengths. This allows for oblique illumination, the benefit of which in the transmissive diffraction grating embodiment of the present invention is described in more detail below.

The operation of optical display apparatus 300 for creating an effective optical display is similar to that of apparatus 20. For example, the activation step for optical display apparatus 300 is the same as for optical display apparatus 20, described above with reference to FIG. 1.

Figure 6:
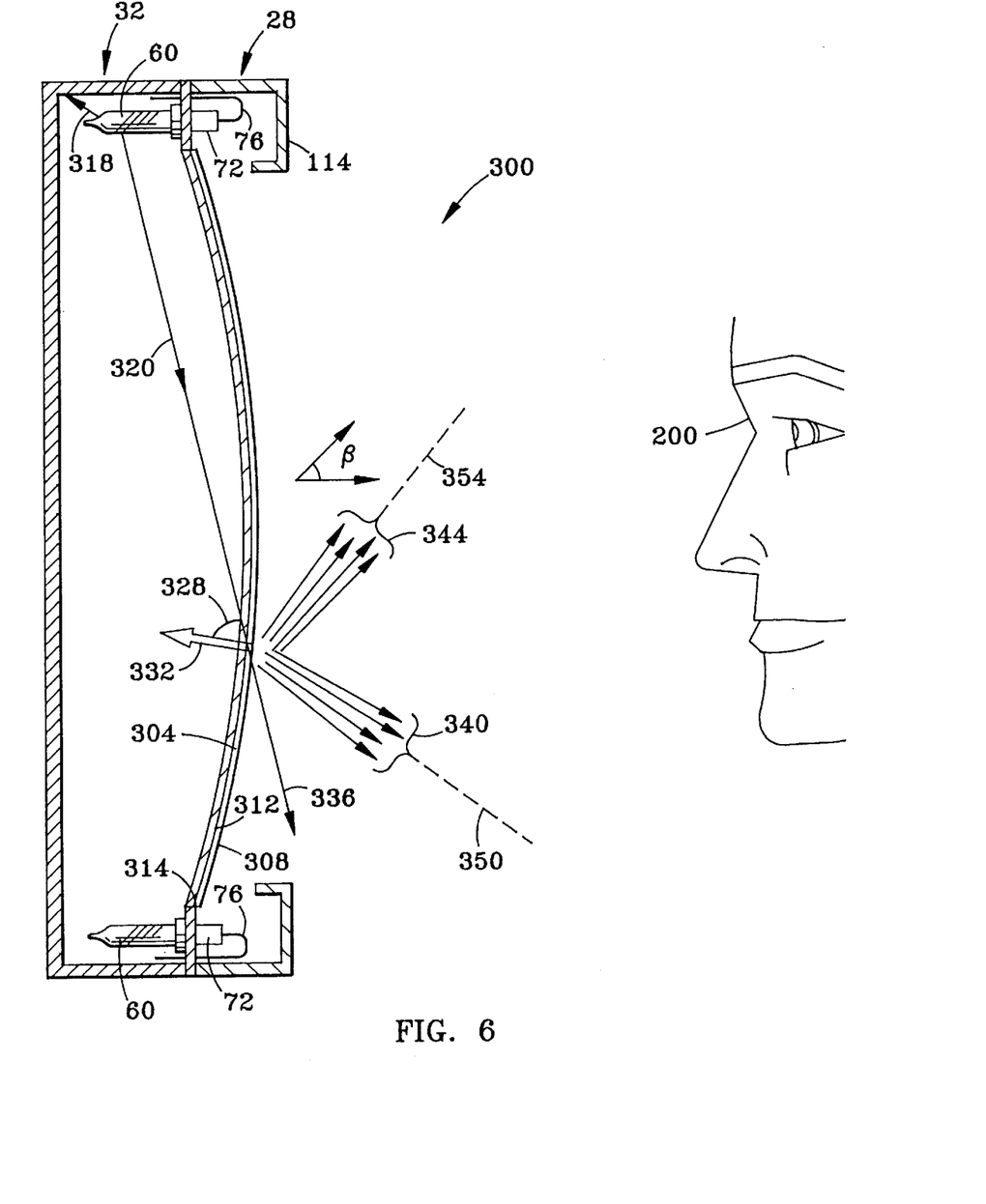
FIG. 6 is a schematic cross-sectional view similar to the view of FIG. 5, illustrating the operation of the transmissive diffraction grating embodiment of the optical display apparatus of the present invention.

With reference now to FIG. 6, each light source 60, when activated, radiates polychromatic light rays over a wide range of directions. Certain of these light rays, such as light ray 318, are not directed toward transmission diffraction grating 304 and are absorbed by the front housing 28 or rear housing 32, the inner surfaces of which are preferably light-absorbing. Other light rays, such as light ray 320, are incident on back surface 312 of transmission diffraction grating 304 at an oblique incident angle 328 as measured with respect to transmissive diffraction grating surface normal 332. A portion of polychromatic light ray 320 is transmitted undiffracted through transmissive diffraction grating 304 as transmitted polychromatic light ray 336. However, because of oblique incident angle 328, light ray 336 is outside field-of-view angle β and thus not visible to viewer 200 viewing optical display apparatus 300.

The remaining portion of incident polychromatic light ray 320 is diffracted within the field-of-view angle β into light ray spectrums 340 and 344 corresponding to first diffraction order 350 and 354, respectively, and is visible to viewer 200. In actuality, many diffraction orders may be present, but only two are shown for the sake of illustration.

Thus, with reference to FIGS. 1, 4, and 6, viewer 200 viewing display apparatus 20 or 300 through central aperture 38 sees, within field-of-view angle β, an optical display pattern 250. Field-of-view angle β, as used herein, is the limiting half-angle within which optical display pattern 250 consists of substantially only diffracted light rays, such as those in light ray spectrums 220 and 224 (FIG. 4) and 340 and 344 (FIG. 6). Accordingly, within field-of-view angle β (that is, within ±β), optical display pattern 250 (FIG. 1) contains substantially no undiffracted light and consists substantially of one or more diffracted light curves 254 (shown as dashed lines in FIGS. 1 and 9) that vary in color over their length and which appear suspended in space in three-dimensions behind either reflection diffraction grating 94 (see FIG. 4) or transmissive diffraction grating 304 (see FIG. 6). By choosing a particular temporal activation mode, optical display pattern 250 can be made very dynamic and have the effect of continuous or nearly continuous motion of diffracted light curves 254, including the effect of rotation. The precise optical display pattern 250 seen by viewer 200 is a function of the curvature of support member 90 and curvature of either reflective diffraction grating 94 or transmissive diffraction grating 304 lying conformally thereon or otherwise connected thereto, the spatial frequency, orientation and number of grating lines contained in the particular diffraction grating, and the spectral composition and temporal activation mode of light sources 60. In a preferred embodiment, field-of-view angle β is 60 degrees.

It will be apparent to one skilled in the art that various means for illuminating diffraction gratings 94 or 304 at oblique angles (see FIGS. 4 and 6) are possible for providing a wide field-of-view angle β. For instance, a single light source can be used when inner surface 111 (FIG. 2) of outer wall 110 is reflective. Or, a single-ring light source having mutually spaced opaque segmentations can be used. In addition, a single light source can be used with mirrors positioned around mounting frame 52 (see, e.g., FIG. 2) to deflect light toward the surface of diffraction grating 94.

The optical display apparatuses 20 and 300 of the present invention are also adaptable for a variety of uses calling for an attractive display. For example, with reference to FIGS. 7 and 8, there is shown an optical display clock 500 comprising all the elements of optical display 20 as described above, and further including a clock motor 504 attached to back 40 of rear housing 32. Clock motor 504 includes a double drive shaft 508 having an inner shaft 512 and an outer shaft 516. Drive shaft 508 protrudes through apertures formed in back 40, support member 90 and reflective diffraction grating 94, respectively. Minute hand 520 is attached to inner shaft 512 and hour hand 524 is attached to outer shaft 516. Preferably, double drive shaft 508 extends to a height approximately equal to the level of inner wall 130 of shade 114 so that minute hand 520 and hour hand 524 do not cast a shadow on reflective diffraction grating 94 when light sources 60 are activated.

Figure 7:
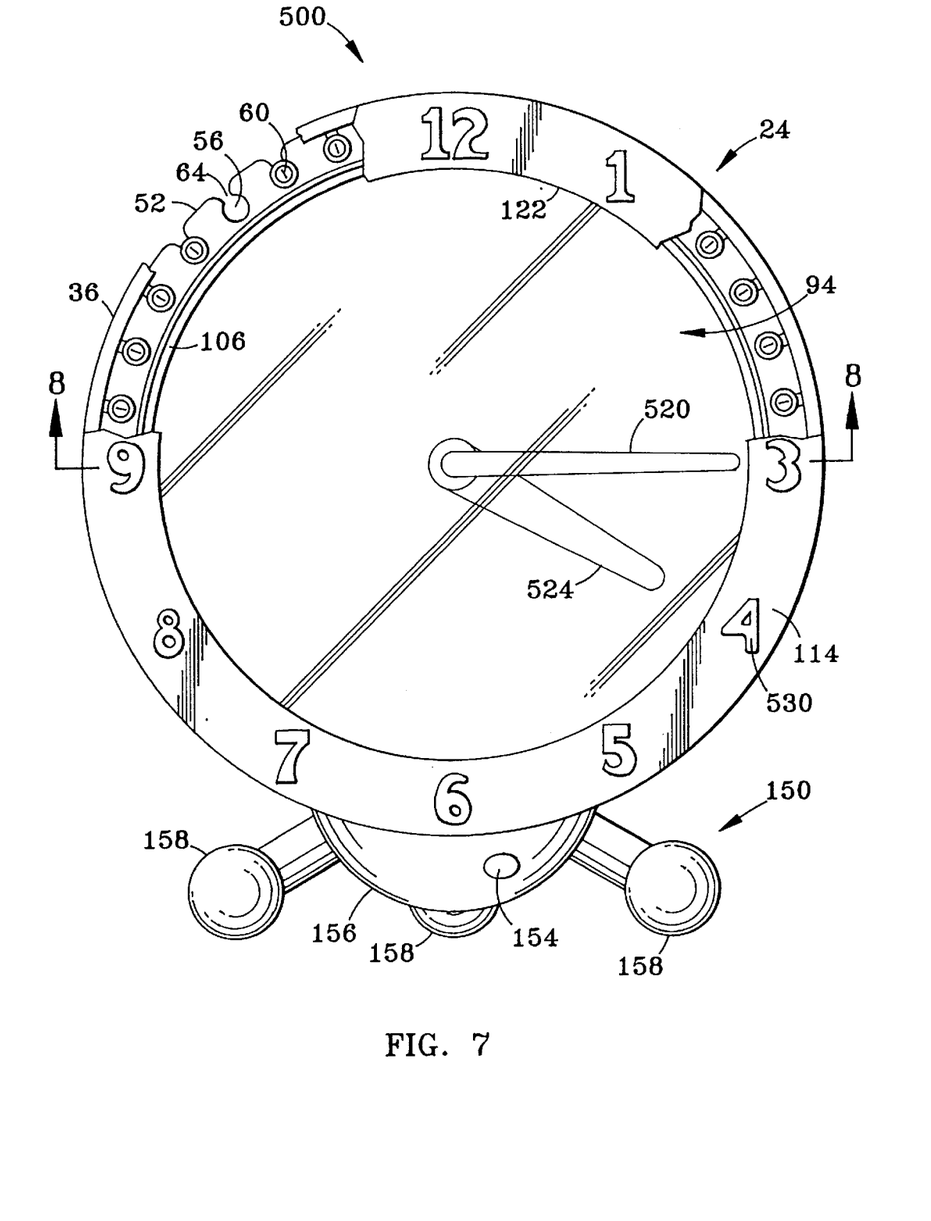
FIG. 7 is a front perspective view of an optical display clock of the present invention.
Figure 8:
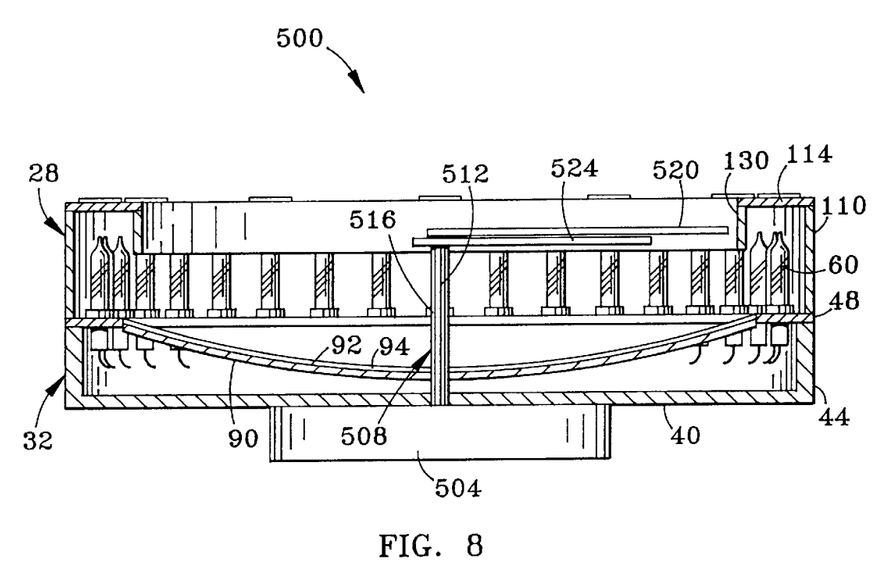
FIG. 8 is a cross-sectional view of the optical display clock of FIG. 7, taken at line 8—8.

With continued reference to FIGS. 7 and 8, in a preferred embodiment, shade 114 includes a transparent or semi-transparent symbols, such as numbers 530, formed therein. Light from light sources 60 blacklight numbers 530 so that they are readily visible to a viewer.

Figure 9:
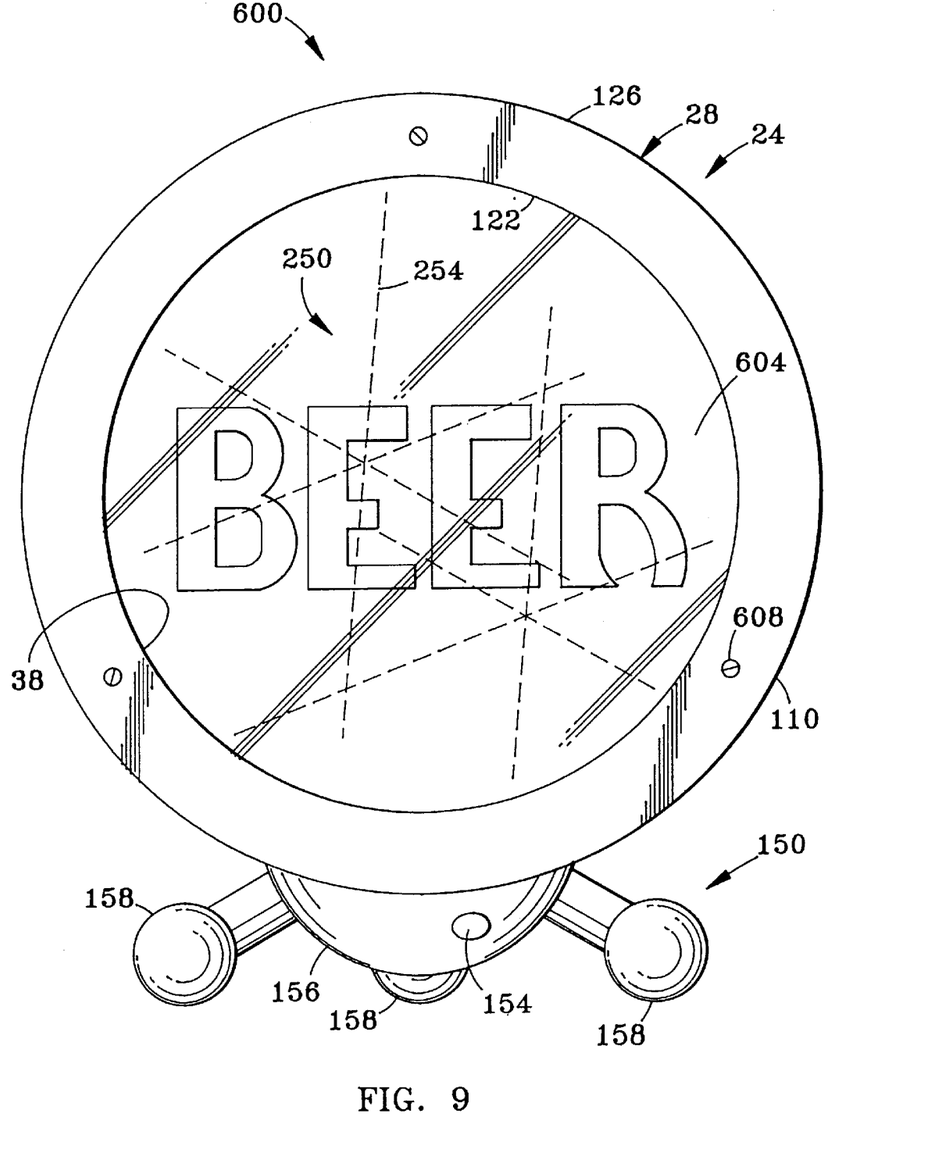
FIG. 9 is a front perspective view of an optical display sign of the present invention.

Another adaptation of display apparatuses 20 or 300 is for an attractive display sign. For example, with reference to FIG. 9, there is shown an optical display sign 600 comprising optical display apparatus 20 as shown in FIG. 1 and further including a non-opaque faceplate 604. Faceplate 604 is attached, for example, to shade 114 by screws 608 and covers display aperture 38. Faceplate 604 may also be attached to inner wall 130 of shade 114 by screws or any number of well-known securing means, such as screws, tape, pre-formed, slots, and the like. Faceplate 604 includes opaque or semi-transparent lettering, symbols, or words, such as the word "BEER," as shown in FIG. 9.

Since certain changes may be made in the optical display apparatuses disclosed herein with respect to preferred embodiments without departing from the scope of the present invention, it is intended that all matter contained in the above description or shown in the accompanying drawings be interpreted in an illustrative and not in a limiting sense.

What is claimed is:

1. A decorative optical display comprising:
    a) a diffraction grating having an isotropic grating pattern and having a perimeter and a surface; and
    b) a plurality of light sources disposed adjacent said perimeter such that each light source substantially entirely illuminates said diffraction grating surface over a wide range of oblique angles so as to form a display pattern comprising diffracted light curves.
2. A decorative optical display according to claim 1, wherein said diffraction grating is a multiple-axis grating.
3. A decorative optical display according to claim 1, wherein said diffraction grating is reflective.
4. A decorative optical display according to claim 1, wherein said diffraction grating is transmissive.
5. A decorative optical display according to claim 1, further including a shade disposed adjacent said plurality of light sources so as to prevent undiffracted light from reaching a viewer viewing the display.
6. A decorative optical display according to claim 5, wherein said shade is opaque.
7. A decorative optical display according to claim 6, wherein said shade is annular.
8. A decorative optical display according to claim 7, wherein said diffraction grating perimeter is circular.
9. A decorative optical display according to claim 1, wherein said plurality of light sources are evenly spaced around said perimeter.
10. A decorative optical display according to claim 1, wherein said light sources in said plurality of light sources are electrically interconnected.
11. A decorative display according to claim 1, wherein said plurality of light sources are polychromatic.
12. A decorative optical display according to claim 1, wherein said diffraction grating perimeter is circular.

13. A decorative optical display according to claim 1, wherein said diffraction grating has a spatial frequency between 750 and 2000 lines/mm.

14. A decorative optical display according to claim 1, wherein said diffraction grating is curved.

15. A decorative optical display according to claim 1, further including a support member to support said diffraction grating.

16. A decorative optical display according to claim 15, wherein said curve is cylindrical concave.

17. A decorative optical display according to claim 15, wherein said support member is non-opaque and said diffraction grating is transmissive.

18. A decorative optical display according to claim 15, wherein said support member has a reflective upper surface and said diffraction grating is transmissive.

19. A decorative optical display according to claim 15, wherein said diffraction grating lies conformally on said support member.

20. A decorative optical display according to claim 19, wherein said support member is curved.

21. A decorative display according to claim 1, further comprising a control unit connected to said plurality of light sources for causing said plurality of light sources to operate in one or more temporal and spatial activation modes.

22. A decorative optical display according to claim 21, wherein said control unit includes a manual selection means for manually selecting said one or more temporal and spatial activation modes.

23. A decorative optical display according to claim 22, wherein one of said one or more temporal and spatial activation modes includes a random illumination sequence.

24. A decorative optical display clock, comprising the decorative optical display of claim 1 and further including:
   a) an aperture through said diffraction grating;
   b) a clock motor with a drive shaft, said clock motor disposed adjacent said diffraction grating, with said drive shaft extending through said aperture; and
   c) at least one clock hand attached to said drive shaft.

25. A decorative display clock according to claim 24, further including a shade with numbers formed therein.

26. A decorative display clock according to claim 25, wherein said numbers are translucent.

27. A decorative display sign comprising the decorative optical display of claim 1, and further including a faceplate disposed above said diffraction grating surface, said faceplate being non-opaque and having symbols thereon.

28. A decorative optical display having a field-of-view angle $\beta$, comprising:
   a) a diffraction grating having an isotropic grating pattern and have a perimeter and a surface; and
   b) a plurality of light sources disposed adjacent said perimeter in a manner such that each light source substantially entirely illuminates said diffraction grating surface over a wide range of oblique angles so as to form a display pattern comprising a plurality of diffracted light curves wherein substantially all light emanating from the optical display falls within said field-of-view angle $\beta$.

29. A decorative optical display according to claim 28, wherein said field-of-view angle $\beta$ is equal to or less than 60 degrees.

30. A decorative optical display according to claim 28, wherein said diffraction grating is transmissive.

31. A decorative optical display according to claim 28, wherein said diffraction grating is reflective.

32. A decorative optical display according to claim 28, wherein said diffraction grating perimeter is circular.

33. A decorative optical display according to claim 28, wherein said diffraction grating is supported in a curved geometry.

34. A decorative optical display according to claim 28, further including a control unit electrically connected to said illumination means for causing said illumination means to operate in one or more temporal and spatial activation modes.

35. A decorative optical display according to claim 34, further including a manual selecting means connected to said control unit for manually selecting said one or more temporal and spatial activation modes of said illumination means.

36. A decorative optical display comprising:
   a) a diffraction grating having an isotropic grating pattern and having a perimeter and a surface, with no particular display pattern recorded therein; and
   b) a plurality of light sources disposed adjacent said perimeter such that each light source substantially entirely illuminates said diffraction grating surface over a wide range of oblique angles so as to form a display pattern comprising diffracted light curves.

37. A decorative optical display having a field-of-view angle $\beta$, comprising:
   a) a diffraction grating having an isotropic grating pattern and have a perimeter and a surface, with no particular display pattern recorded therein; and
   b) a plurality of light sources disposed adjacent said perimeter in a manner such that each light source substantially entirely illuminates said diffraction grating surface over a wide range of oblique angles so as to form a display pattern comprising a plurality of diffracted light curves wherein substantially all light emanating from the optical display falls within said field-of-view angle $\beta$.

* * * * *